United States Patent Office 3,496,524
Patented Feb. 17, 1970

3,496,524
DOPPLER SONAR NAVIGATION SYSTEM COMPENSATED FOR SOUND VELOCITY VARIATIONS
Gus Stavis, Briarcliff Manor, and Leonard O. Vladimir, Chappaqua, N.Y., assignors to Singer-General Precision, Inc., a corporation of Delaware
Filed Nov. 18, 1968, Ser. No. 776,540
Int. Cl. G01s 9/66
U.S. Cl. 340—3    10 Claims

ABSTRACT OF THE DISCLOSURE

A sonar Doppler system is provided in which sound waves are projected from each of four transducers, so oriented that the beams emanating therefrom are projected from a water borne vessel toward the sea bottom at discrete areas located in each of the four quadrants at angles of 45° to the heading and cross-heading of the vehicle. The same transducers are also used for receiving the echo signals reflected from the discrete areas and these transducers and their associated circuitry are so switched that they transmit 50% of the time and receive for the remainder of the time. The received signals are mixed in Janus pairs and with a signal from the transmitting oscillator to provide Janus pairs of Doppler signals, which are applied to frequency trackers to obtain single frequency signals representative of the center frequencies of the returned Janus pair Doppler spectra. These signals are in turn utilized to obtain quantities represented by cross-heading and along-heading volocities which may be further utilized to obtain such navigational outputs as are desired. Because the velocity of sound waves in sea water varies with its temperature and salinity, a system is provided whereby the frequency of the oscillator, generating the transmission signals, is varied in accordance with the conditions which obtain in the surrounding water environment so that errors in Doppler shifted return echo signals due to varying propagation velocities are eliminated.

The present invention relates to a sonar Doppler system, particularly adapted for use on water borne vessels either of the surface or submersible type.

Various systems utilizing the Dopper principle for navigation purposes have been devised both for air navigation as exemplified by patents, Nos. 2,908,903 and 2,981,944 and water borne navigation such as exemplified by patent, No. 1,864,638. These systems all have one thing in common, namely, signals are transmitted from the vehicle either toward the earth's surface or the sea bottom and the return echo signals are processed to determine the Doppler shift in frequency, which occurs by reason of the vessel's volocity relative to the direction of the signal beam.

Mathematically, the change in frequency undergone by the transmitted signal is being transmitted by a moving vehicle and reflected from a stationary body may be expressed as, $$\nu = 2V/\lambda \cos \gamma \qquad (1)$$

where $\nu$ is the Doppler shift in frequency, V is the velocity of the vehicle, $\lambda$ is the wavelength of the signal energy and $\gamma$ is the angle between the center of the energy beam and the horizontal.

In airborne systems using electromagnetic microwave energy the speed of transmission of the microwave energy is constant regardless of environmental conditions of the medium through which the signal is transmitted and hence, the wavelength is also constant so that using proper tracking techniques the Doppler shift in frequency can be obtained with a high degree of accuracy. This is not the case, however, when sound waves, sonic or ultrasonic, are transmitted through sea water. In such instances the velocity of sound is a function of both the temperature and the salinity of the water, there being variations of 0.2% per degree centigrade and 0.1% per 0.1% salinity change.

While correction factors derived from temperature and salinity measurements may be incorporated into the system, such arrangements lead to overcomplication and it is preferable to provide a system which is immune to such changes thereby obviating the need for such compensation. Accordingly, the system of the present invention incorporates an arrangement which maintains the wavelength of the transmitted energy constant regardless of the conditions of the environment through which it is transmitted.

More specifically, the present invention contemplates a system in which a master oscillator generates sound signals which are applied at a 50% duty cycle to four transducers, so arranged as to transmit beams of sound energy toward the sea floor in right and left forward directions and right and left aft directions at equal angles of 45° to the heading of the vehicle. The return echo signals are received by the same transducers during the remainder of their 50% duty cycle and are mixed with the signal output of the master oscillator to provide signals having a Doppler frequency information content. These Doppler signals are frequency tracked to provide single frequency signals corresponding to the center frequencies of the echo Doppler spectra signals and applied to a computer from which cross-heading and along-heading velocities are derived, which latter velocity indications may be further processed to obtain such navigational data as is desired.

In order to main the wavelength of the sound energy transmitted constant regardless of the environmental conditions of the medium through which it is transmitted, a deep-sea velocimeter is submersed in the medium and a signal is generated thereby, the frequency of which depends on the present velocity of sound through the medium. The signal generated by the velocimeter is then used to control the frequency of the master oscillator so that regardless of the conditions of the water the wavelength of the energy transmitted therethrough, is maintained constant.

A purpose of the invention is to provide a sonar Doppler system for accurately obtaining parameters which may be used for navigational purposes in a water borne vehicle.

Another purpose of the invention is to provide a sonar Doppler system in which transmitted signals are automatically, maintained at a constant wavelength regardless of water conditions, so that Doppler signal accuracy is greatly improved.

A further understanding of the invention may be secured from the detailed description and drawings, in which.

Figure 1:
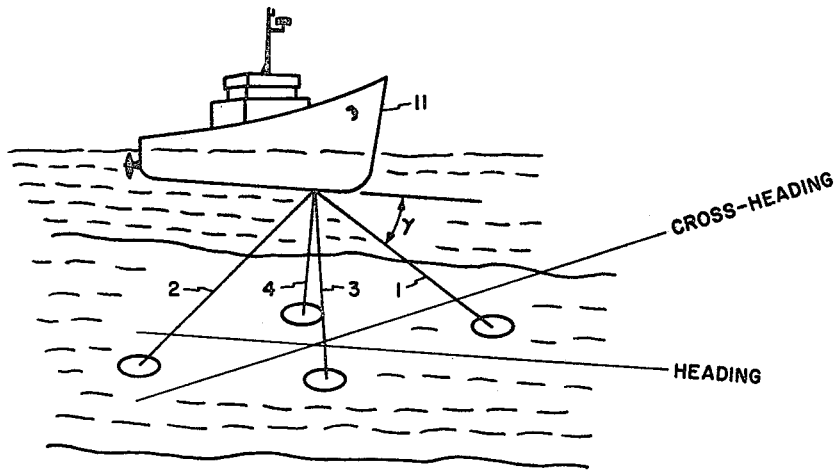
FIG. 1 is a diagrammatic view illustrating the path of the transmitted and echo beams in relation to a surface ship.

Referring now to FIG. 1, a water borne vehicle 11 is shown as a surface vessel although it is to be understood that this vehicle may also be a submersible. Mounted on the hull thereof are four transducers which are time shared so that they transmit sound waves, of a frequency nominally of say 400 kHz., toward the ocean floor of 50% of the time and receive return echo signals from the remainder of the time. The transducers are so mounted that the beams are transmitted downwardly at angle γ with respect to the horizontal plane of the vessel and so directed as to project and receive sound energy in each of the four quadrants at equal angles of 45° to the heading and cross-heading of the vessel, thus forming an X pattern of beam geometry as perhaps best illustrated in the plan view of FIG. 2.

Figure 3:
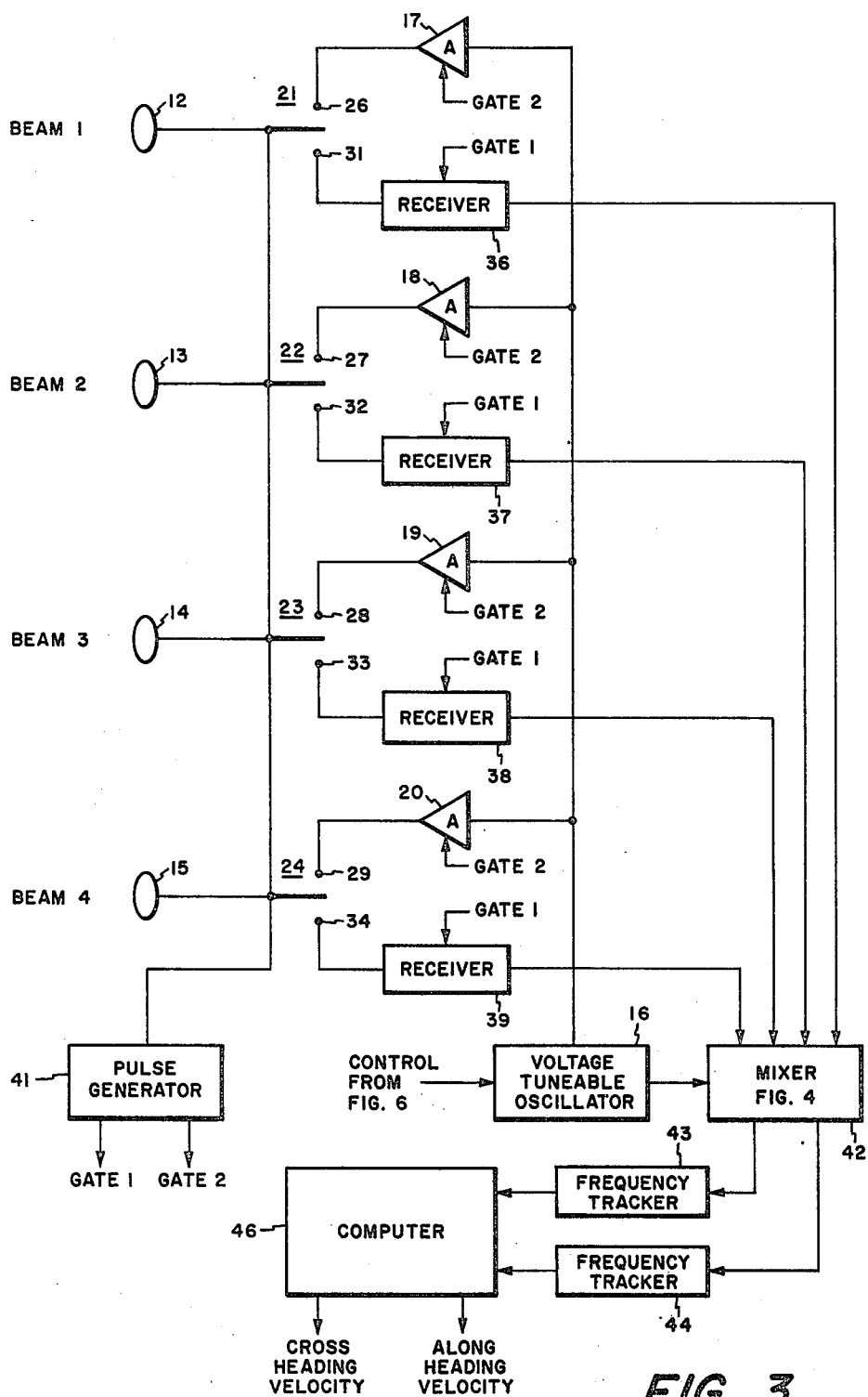
FIG. 3 is a block diagram of the sonar transmitting and receiving system of the invention.

Referring now to FIG. 3, there is therein illustrated in block form a circuit for energizing the transducers as well as receiving and processing the return echo signals.

The four transmitting and receiving transducers are illustrated by the diagrammatic representations 12, 13, 14 and 15. When acting as transmitters each of the transducers 12–15 are energized by the signal generated by a single oscillator 16 generating a signal of nominally 400 kHz. through respective amplifiers 17, 18, 19 and 20, the outputs of which are connected to one pole of each of switches 21, 22, 23 and 24. For simplification of representation these switches are illustrated in mechanical form, but it will be realized that in practice, solid state switches electronically operated, would be utilized. When the switches 21–24 dwell on their respective contacts 26–29 the outputs of the respective amplifiers are connected to respective ones of the transducers 12–15 and these transducers thus act as transmitters.

Conversely when the switches 21–24 dwell on their respective contacts 31–34 the respective transducers 12–15 are connected to the inputs of respective ones of the receivers 36, 37, 38, 39 and at this time the transducers act as receivers. In the present instance it is desired to have a 50% duty cycle, that is to say, the transducers transmit sound waves half of the time and receive and convert the sound wave to electrical signals during the remaining half of the time.

To provide this switching action, the switches are powered by the output of a pulse generator 41 which generates a switching signal, whose frequency is randomly varied in the range of 3000 Hz. to 5000 Hz. to operate all of the switches simultaneously at the then generated frequency. The reason the switching signal is randomly varied over a range of frequencies is to avoid, what are known in a pulse system such as this, as "altitude holes." To be more specific, each of the receivers is gated off by a gate 1 signal generated by the pulse generator 41 when the switches are connected to their transmitting terminals to insure isolation while conversely, the amplifiers 17–20 are gated off during receiving times when the swtiches are connected to their associated receivers. If the pulse generator 41 were maintained at a single frequency there would be distances where the return echo arrives at just the time the receiver is gated off and no return echo signal could be processed, hence the term "altitude holes." By varying the pulse repetition frequency, however, some of the return echo signals in any train of such signals will always arrive at the time the receivers are actuated and the "altitude hole" effect avoided.

The outputs of the receivers which have frequencies corresponding to the signal frequency of the oscillator 16 Doppler shifted by an amount ν proportional to the component of the velocity of the vessel along a particular beam path are impressed on the mixer 42 as is the output of the oscillator 16. In this mixer in a manner, later to be described, the return echo signals are mixed with the oscillator signal to produce two signals which are proportional to the sum of the Doppler shifts in frequencies of beams 1 and 2 and the sum of the Doppler shifts in frequencies of beams 3 and 4.

As is well known, when a transmitted beam covers a finite area the return signal is not of a single discrete frequency, but constitutes a spectrum of frequencies of Gaussian distribution. In order to obtain accurate output indications, these various spectra signals must be tracked to produce as an output or outputs a single discrete signal frequency, which should preferably correspond to the center frequency of the Doppler spectrum of returned or echo signals. To this end, the signals corresponding to the sum of the Doppler spectra signals returned from beams 1 and 2 are applied to a frequency tracker 43 while the signals corresponding to the sum of the Doppler spectra signals returned from beams 3 and 4 are applied to a frequency tracker 44.

Each of these trackers may be sine-cosine frequency trackers of the type described in Patent No. 3,121,303 and their outputs, each consist of a single frequency signal corresponding to the center frequency of their signal spectra frequency inputs.

The outputs of each of the frequency trackers 43 and 44 are applied to the input of a computer 46 in which the inputs in a manner later to be described, are converted to a first signal representative of a velocity along the heading of the vessel and cross-heading velocity. Further converting means which are well known and form no part of the present invention, may be utilized to produce any one of many navigational indications, such as velocity along track and drift, present position, distance tracked and the like.

It is desired that the return echo signals of beams 1 and 2 be added and likewise, that the return echo signals of beams 3 and 4 be added, so as to obtain the benefits of fore-aft mixing, but the addition must be done in a coherent fashion so as not to lose sense. This is accomplished by the mixer 42 which includes the components interconnected as disclosed in FIG. 4.

Figure 4:
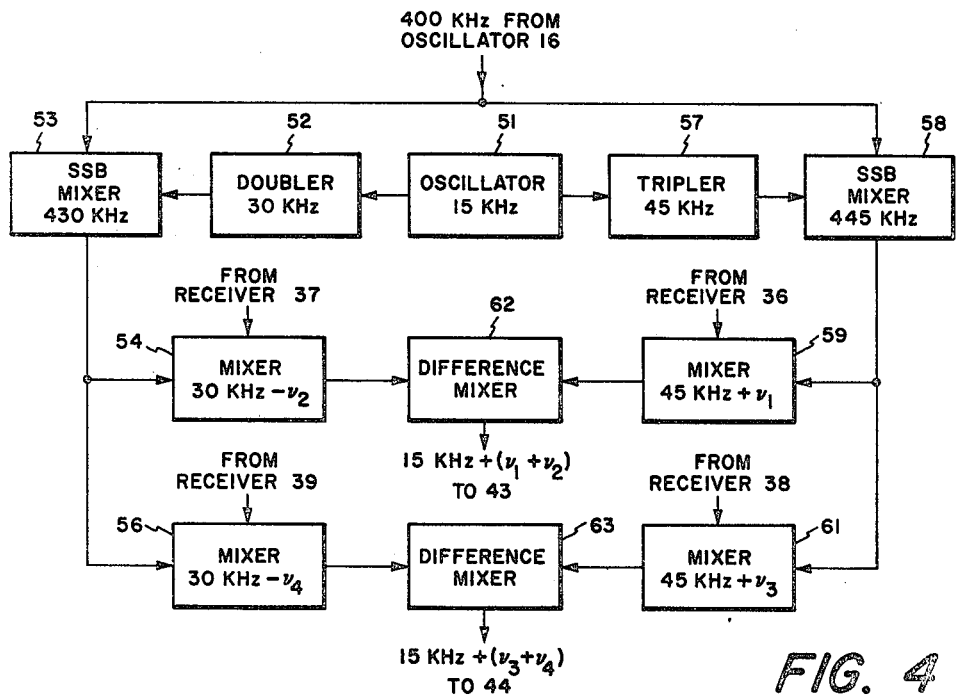
FIG. 4 is a block diagram of the mixer used in the system.

Referring now to the block diagram of FIG. 4, an oscillator 51 having a signal frequency of, say 15 kHz., applies its output to two branches. In the first branch the output signal of the oscillator 51 is doubled in frequency in a doubler 52 and the doubled frequency is applied to a single sideband mixer 53. A second input for the mixer 53 is derived from the oscillator 16 (FIG. 3) so that the frequency of the signal output of mixer 53 has a frequency of 430 kHz.

The output of the mixer 53 is applied as one input to the mixer 54 and also as one input to the mixer 56. A second input for the mixer 54 is obtained from the receiver 37, so that the signals applied as inputs to the mixer 54 consist of the 430 kHz. signal output of the mixer 53 and a 400 kHz. signal modified by the Doppler shift of the return signal received from beam 2, this Doppler shift here being denoted $\nu_2$. It will be here assumed that the vessel is moving in a forward direction, so that the Doppler shift would be a downward shift denoted by $-\nu_2$ so that the output of mixer 54 is indicated by the legend 30 kHz. $-\nu_2$.

The second input of mixer 56 is derived from the output of receiver 39, so that this input is the 400 kHz. signal also down-shifted by the Doppler shift frequency $\nu_4$ of beam 4 so that the output frequency of mixer 56 may be expressed as 30 kHz. $-\nu_4$.

In the second branch of the mixer the output of oscillator 51 is tripled in a tripler 57, the output of which is applied as one input to a single sideband mixer 58. The other input to the mixer 58 is derived from the 400 kHz. oscillator 16 of FIG. 3, so that the output of mixer 58 is a signal having a frequency of 445 kHz. This later signal is applied as one of the inputs to each of the mixers 59 and 61.

The second input to the mixer 59 is obtained from the output of receiver 36 and since we have assumed the vessel is moving in a forward direction, the receiver output signal is upshifted from the 400 kHz. frequency by Doppler shift content of beam 1, denoted by $+\nu_1$. The second input to the mixer 61 is obtained from the output of receiver 38, so that under the assumption, herein, its frequency is also upshifted from the 400 kHz. frequency by the Doppler shift content of beam 3, denoted by $+\nu_3$.

Thus mixer 59 will have an output of 45 kHz. $+\nu_1$, while mixer 61 will have an output of 45 kHz. $+\nu_3$.

The output of mixers 54 and 59 are applied as inputs to the difference mixer 62, so that fore and aft mixing of the Doppler shift contents of beams 1 and 2 are mixed and under the assumption of forward vessel motion the output of mixer 62 is a signal greater than 15 kHz. by an amount determined by the Doppler shift content $\nu_1$ and $\nu_2$ of beams 1 and 2. The output is applied to the input of frequency tracker 43.

Similarly the outputs of mixers 56 and 61 are applied as inputs to the difference mixer 63, so that its output is a signal greater than 15 kHz. by an amount determined by the Doppler shift content $\nu_3$ and $\nu_4$ of beams 3 and 4. This output is applied to the input of frequency tracker 44.

On the other hand, if the vessel is moving backwards, the outputs of both difference mixers 62 and 63 will be less than 15 kHz. by an amount determined by the Doppler shift content of the pairs of Doppler signals applied thereto.

After the mixed Doppler frequency spectra have been converted to single frequency representations in the frequency trackers 43 and 44 it is desired that representations of cross-heading and along-heading velocities be obtained so that such other navigational outputs and displays may be obtained as desired.

Figure 5:
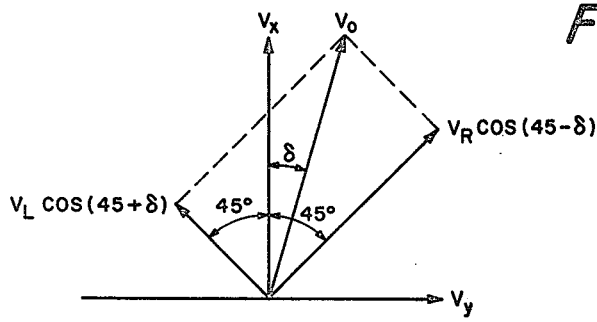
FIG. 5 is a vector diagram used for explanation purposes.

This operation is performed in the computer 46 and its operation can best be understood by reference to the vector diagram of FIG. 5.

Figure 2:
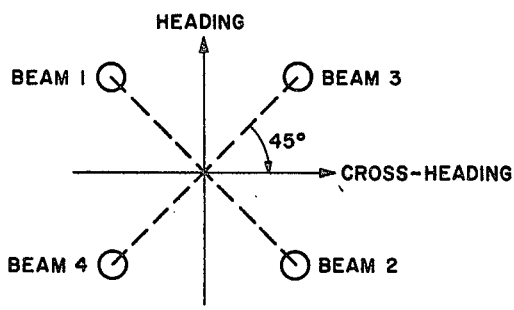
FIG. 2 is a plan view of the geometry of the beam paths.

As has heretofore been stated in connection with the beam geometry and as illustrated in FIGS. 1 and 2, the energy beams are so directed as to make equal angles of 45° as respects along-heading and cross-heading velocity. Now referring to FIG. 5, let it be assumed that the vessel has a forward velocity $V_o$ and a drift angle $\delta$ relative to the heading $V_x$. As heretofore stated, beams 1 and 2, in the forward left and aft right quadrants (FIG. 2), are mixed to provide a measure of the component of velocity at +45° heading. The component is designated as $V_L$. Beams 3 and 4, i.e. forward right and left aft, are mixed to provide a corresponding velocity vector $V_R$ at −45° to heading. The Doppler shift as measured in beams 1 and 2 is given by $\nu_R$ and the Doppler shift as measured in beams 3 and 4 is given by $\nu_L$ as follows:

$$\nu_R = \frac{4V_o \cos(45-\delta)}{\lambda} \cos \gamma \qquad (2)$$

$$\nu_L = \frac{4V_o \cos(45+\delta)}{\lambda} \cos \gamma \qquad (3)$$

where $\lambda$ is the wavelength and $\gamma$ is the angle of the beams as respects the horizontal plane as previously stated.

If these the quantities (2) and (3) are added using the trigonometric identity:

$$\cos(A+B)+\cos(A-B)=2\cos A \cos B \qquad (4)$$

we then obtain $$\nu_R+\nu_L = \frac{8V_o \cos \gamma}{\lambda} \cos 45° \gamma \qquad (5)$$

Referring to FIG. 5

$$V_x - V_o \cos \gamma \qquad (6)$$

therefore $$\nu_R + \nu_L = KV_x \cos 45° \qquad (7)$$

K being a constant since for present purposes $\lambda$ and $\gamma$ are deemed to be constant. Since cos 45° is also a constant it follows that $$\nu_R + \nu_L = K^1 V_x \qquad (8)$$

$K^1$ also being a constant.

In an entirely similar manner it can be shown that $$\nu_R - \nu_L = K^1 V_y \qquad (9)$$

The two velocity vectors $V_x$ in along-heading and $V_y$ in cross-heading deck plane coordinators are thus obtained by simply adding and subtracting the outputs of frequency trackers 43 and 44 in the computer 46.

In the discussion of the invention so far, the frequency of the output signal of the oscillator 16 (FIG. 3) has been stated to be 400 kHz., however, if this frequency is made invarient, errors will be introduced by reason of the fact that the velocity of sound in water is not a constant, but varies with its temperature and salinity. What is desired then is to so vary the basic frequency of oscillator 16 that the wavelength of the sound propagated through the water is maintained constant regardless of changed environmental conditions, in other words $\lambda$ of Equations 2, 3, and 5 must be a constant at all times and under all conditions.

Figure 6:
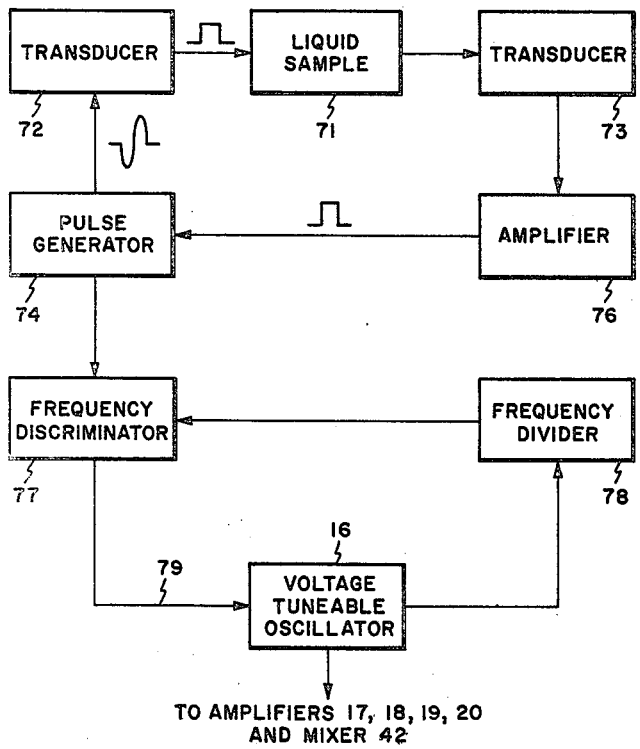
FIG. 6 is a block diagram of the oscillator compensation circuit.

An important feature of the invention, therefore, is to continuously determine the velocity of the sound in the surrounding sea water and to use this determination for automatically so controlling the frequency of the oscillator in such an amount that the wavelength of propagation, $\lambda$, is maintained constant. A circuit for accomplishing this operation is disclosed in block form in FIG. 6.

Referring now to this figure, a liquid sample 71 of the surrounding sea water at the conditions pertaining at any given time is interposed between a transmitting transducer 72 and a receiving transducer 73. The transmitting and receiving transducer may conveniently be enclosed in a single chamber into which the sea water is allowed to penetrate, so that a column or path of sea water at existing conditions extends between the transducers.

A pulse generator 74 produces pulse signals timed in a manner later to be described, which pulse signals are applied to the transducer 72. The transducer 72 then produces a sound pulse in the water path represented by the liquid sample 71 and this sound pulse travels along this path at a velocity determined by the condition of the water sample. At some time after the introduction of the sound pulse on the liquid path depending on the velocity therein, the sound pulse impinges on the receiving transducer 73 generating a corresponding electrical pulse. This electrical pulse is then amplified by the amplifier 76 and after such amplification is applied to the pulse generator 74 to trigger this generator to produce a subsequent transmission pulse. It will be apparent, therefore, that the pulse generator 74 generates a train of pulse signals, the frequency of which is directly proportional to the velocity of sound through the liquid sample. This portion of the circuit is well known and has been termed a "sing-around" velocimeter as so referred to and described by M. Greenspan and C. E. Tschiegg in their lecture entitled "Measuring the Speed of Sound in the Sea" appearing at pages 87–101 of Underwater Acoustics edited by V. M. Albers and published by Plenum Press in 1963.

Figure 7:
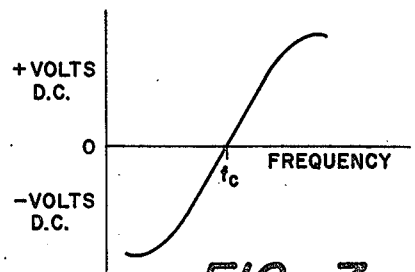
FIG. 7 illustrates the characteristic of the frequency discriminator used in the circuit of FIG. 6.

The output of the pulse generator 74 constitutes one input of the frequency discriminator 77 which has a characteristic such as disclosed in FIG. 7. That is to say, if the difference of the two inputs is a frequency $f_c$ there will be a zero output, whereas if the comparison frequency is greater than $f_c$ a positive D.C. output is produced. On the other hand, if the comparison frequency is less than $f_c$ a negative D.C. output is produced.

The second input for the frequency discriminator 77 is derived from the voltage tuneable oscillator 16 (FIGS. 3 and 6) and since the frequency of the signal produced by the pulse generator 74 using a convenient length of liquid path in the element 71 can be expected to be about 1/60 of the nominal frequency of the oscillator 16, a frequency divider 78 is interposed between the output of the oscillator 16 and the second input of the frequency discriminator 77, so that the two inputs of the discriminator 77 are of comparable frequencies.

The output of the frequency discriminator 77 applied to the conductor 79, is, therefore, a direct current signal whose sense and amplitude depends on the variation between the frequency of the sound in water and the frequency of the signal generated by the oscillator 16. This output or conductor 79 constituting a correction signal is then applied to oscillator 16 to so change its frequency that coincidence between the the two inputs of the frequency discriminator 77 is achieved and the oscillator 16 is so corrected in frequency of output that the wavelength of the sound signal transmitted through the sea water is maintained constant at all times.

Thus, a sonar Doppler system is provided which produces indications of heading and cross-heading velocity with a high degree of accuracy regardless of the variations in velocity of sound propagation through the medium with which the system is surrounded.

What is claimed is:

1. A sonar Doppler system for a water borne vessel comprising,
    a master oscillator on said vessel,
    a plurality of transducers mounted on said vessel so oriented that sound energy projected therefrom is transmitted in narrow beam paths toward discrete areas on the sea bottom located forward and aft of said vessel and from which echo signals are returned to the same transducers along the same beam paths,
    a plurality of receivers corresponding in number to the number of transducers, respective ones of said receivers being associated with respective ones of said transducers,
    switch means for simultaneously connecting the output of said master oscillator to all of said transducers for a first selected period of time whereby said transducers are simultaneously energized and beams of sound energy are directed thereby toward said discrete areas, said switch means simultaneously connecting the output of each transducer to its associated receiver for a second selected period of time whereby the echo signal reflected from each discrete area along each beam path is converted to an electrical signal in each receiver whose frequency is Doppler shifted by an amount corresponding to the vessels velocity component along each respective beam path,
    mixer means having the output of said master oscillator and the outputs of said receivers impressed thereon and producing therefrom a pair of Doppler shift signals, and
    frequency compensating means for varying the frequency of said master oscillator in accordance with the conditions of the water surrounding said vessel to maintain the wavelength of the sound beams projected by said transducers at a constant value despite changes in the velocity of sound propagation in said water.

2. A sonar Doppler system as set forth in claim 1 in which four transducers are provided oriented so as to project four beams of sound energy right and left forward and right and left aft at equal 45° angles to the vessel heading and cross-heading.

3. A sonar Doppler system as set forth in claim 2 in which said mixer means includes means for mixing the echo signals received from said forward left and said aft right beams with a selected offset frequency signal to produce a first Doppler shift spectrum signal which is equal to the sum of the offset frequency and the Doppler shift spectra frequencies of said forward left and aft right echo signals, and
    means for mixing the echo signals received from said forward right and said aft left beams with said selected offset frequency signal to produce a second Doppler shift spectrum signal which is equal to the sum of the offset frequency and the Doppler shift spectra frequencies of said forward right and aft left echo signals.

4. A sonar Doppler system as set forth in claim 3 in which said first Doppler shift spectrum signal is applied to a first frequency tracker to produce a first tracker output signal which is equal to the center frequency of said first Doppler spectrum signal,
    said second Doppler shift spectrum signal is applied to a second frequency tracker to produce a second tracker output signal which is equal to the center frequency of said second Doppler shift spectrum signal,
    and computer means having the outputs of said first and second frequency trackers imposed thereon for adding and subtracting said frequency tracker outputs.

5. A sonar Doppler system as set forth in claim 1 in which said frequency compensating means includes a sing-around velocimeter including a sample of the surrounding sea water for producing a calibration signal the frequency of which is dependent on the velocity of sound in the sea water sample,
    means for comparing the frequency of said calibration signal with the signal frequency output of said master oscillator to produce a comparison signal, and
    means for adjusting the signal frequency of said master oscillator in accordance with the value of said comparison signal.

6. A sonar Doppler system as set forth in claim 5 in which four transducers are provided oriented so as to project four beams of sound energy right and left forward and right and left aft at equal 45° angles to the vessel heading and vessel cross-heading.

7. A sonar Doppler system as set forth in claim 6 in which said mixer means includes means for mixing the echo signals reecived from said forward left and said aft right beams with a selected offset frequency signal to produce a first Doppler shift spectrum signal which is equal to the sum of the offset frequency and the Doppler shift spectra frequencies of said forward left and aft right echo signals,
    means for mixing the echo signals received from said forward right and aft left beams with said selected offset frequency signal to produce a second Doppler shift spectrum signal which is equal to the sum of the offset frequency and the Doppler shift spectra frequencies of said forward right and aft left echo signals, and
    frequency tracker means for producing single frequency signals corresponding to the center frequencies of said first and second Doppler shift spectrum signals.

8. A sonar Doppler system as set forth in claim 1 in which said frequency compensating means comprises,
    a pulse generator generating an electrical pulse signal,
    a transmitting transducer immersed in a liquid sample of the surrounding sea water, said transmitting transducer being energized by said electrical pulse signal whereby it transmitts a pulse sound signal into said sea water sample,
    a receiving transducer immersed in said liquid sample and spaced from transmitting transducer by a selected distance to provide an intervening path therebetween, said receiving transducer generating an electrical output pulse signal on receiving a pulse from said transmitter after travel through said intervening path of sea water,
    means for triggering said pulse generator by electrical output pulse signals produced by said receiving transducer whereby the pulse repetition frequency of said pulse generator is determined by the velocity of sound in said intervening path,
    a frequency divider connected to the output of said master oscillator dividing the frequency of the output signal thereof to produce a frequency divided signal having a frequency comparable with the frequency of the pulse signal produced by said pulse generator, a frequency discriminator having the output of said pulse generator and said frequency divided signal impressed thereon, and means for controlling the frequency of the signal generated by said master oscillator by the output of said frequency discriminator.

9. A sonar Doppler system as set forth in claim 8 in which four transducers are provided oriented so as to project four beams of sound energy right and left forward and right and left aft at equal 45° angles to the vessel heading and vessel cross-heading.

10. A sonar Doppler system as set forth in claim 9 in which said mixer means includes means for mixing the echo signals received from said forward left and said aft right beams with a selected offset frequency signal to produce a first Doppler shift spectrum signal which is equal to the sum of the offset frequency and the Doppler shift spectra frequencies of said forward left and aft right echo signals, means for mixing the echo signals received from said forward right and aft left beams with said selected offset frequency signal to produce a second Doppler shift spectrum signal which is equal to the sum of the offset frequency and the Doppler shift spectra frequencies of said forward right and aft left echo signals, and frequency tracker means for producing single frequency signals corresponding to the center frequencies of said first and second Doppler shift spectrum signals.

References Cited

UNITED STATES PATENTS 2,841,775   7/1958   Saunders _____ 340—3

RICHARD A. FARLEY, Primary Examiner